US005838982A

United States Patent [19]

Cooper et al.

[11] Patent Number: 5,838,982

[45] Date of Patent: Nov. 17, 1998

[54] POWER SWITCH METHOD AND APPARATUS FOR PREVENTING A FAILURE IN THE POWER CONTROLLER

[75] Inventors: Barnes Cooper, Aloha, Oreg.; Steven Ray Bard, Vancouver, Wash.

[73] Assignee: Intel Corporation, Santa Clara, Calif.

[21] Appl. No.: 769,386

[22] Filed: Dec. 19, 1996

[51] Int. Cl.[6] .......... G06F 1/30

[52] U.S. Cl. .......... 395/750.01

[58] Field of Search .......... 395/750.01–750.08

[56] References Cited

U.S. PATENT DOCUMENTS

| | | | |
|---|---|---|---|
| 5,513,359 | 4/1996 | Clark et al. | 395/750 |
| 5,530,879 | 6/1996 | Crump et al. | 395/750 |
| 5,539,298 | 7/1996 | Perkins et al. | 320/21 |
| 5,640,312 | 6/1997 | Carroll | 363/21 |
| 5,692,197 | 11/1997 | Narad et al. | 395/750 |
| 5,708,861 | 1/1998 | Higaki et al. | 396/48 |
| 5,758,174 | 5/1998 | Crump et al. | 395/750.05 |

*Primary Examiner*—Meng-Al T. An
*Assistant Examiner*—David A. Wiley
*Attorney, Agent, or Firm*—Kenyon & Kenyon

[57] ABSTRACT

A computer typically includes a power switch. A method of power switch management of the computer may be implemented in which a system power operation of the computer is performed if the power switch has been activated in a first manner and an operation of the computer other than a system power operation of the computer is performed if the power switch has been activated in a second manner. The operation of the computer other than a system power operation of the computer can include, for example, a suspend/resume operation of the computer.

27 Claims, 2 Drawing Sheets

RELOAD WATCHDOG TIMER
102
INCREMENT POWER SWITCH MANAGEMENT TIMER
104
106
IS POWER BUTTON PRESSED DOWN?
NO
132
INITIATE POWER SWITCH MANAGEMENT TIMER TO ZERO
YES
108
HAS TIMER REACHED DEBOUNCE COUNT?
YES
NO
130
HAS TIMER REACHED OVERRIDE COUNT?
NO
END
YES
110
IS SYSTEM POWER OFF?
NO
116
IS SYSTEM SUSPENDED?
NO
128
TURN OFF SYSTEM POWER
YES
YES
112
DOES SYSTEM HAVE AVAILABLE POWER SOURCE?
NO
YES
118
IS POWER SWITCH IN SUSPEND/ RESUME MODE?
NO
YES
124
IS POWER SWITCH IN SUSPEND/ RESUME MODE ?
NO
YES
126
GENERATE POWER SWITCH SMI
114
TURN ON SYSTEM POWER
END
120
DOES SYSTEM HAVE AVAILABLE POWER SOURCE?
NO
YES
END
122
MOMENTARILY RESUME SYSTEM AND GENERATE POWER SWITCH SMI

POWER SWITCH METHOD AND APPARATUS FOR PREVENTING A FAILURE IN THE POWER CONTROLLER

BACKGROUND OF THE INVENTION

The present invention relates to power switch management of a computer. More particularly, the present invention relates to microcontroller power switch management of a computer.

Mobile computer designs sometimes employ use of a generic class of microcontrollers to perform system management activities such as charging batteries, controlling power planes, and detecting system events. Detected system events include such things as lid open/close (to cause system suspend/resume), AC adapter insertion/removal (to cause power management on/off), and power switch management (to turn power on/off).

A major problem associated with managing these types of hardware events with a firmware-based solution running on a microcontroller is that if the microcontroller should stop execution for some reason, system power cannot be turned off and, in many cases, the system must be disassembled to remove all power sources in the system.

Conventional computers do not provide a single button for implementing either a suspend/resume operation or on/off operation of the computer which is context sensitive. Additionally, conventional computers do not provide any hardware override function to reset the system if the system ever fails to respond to the power button.

SUMMARY OF THE INVENTION

The present invention relates to a method of power switch management of a computer. If a power switch of the computer has been activated in a first manner, the method performs a system power operation (or function) of the computer. If the power switch of the computer has been activated in a second manner, the method performs an operation (or function) of the computer other than the system power operation (or function) of the computer. The operation (or function) of the computer other than a system power operation (or function) of the computer may be, for example, a suspend/resume operation (or function) of the computer.

The present invention additionally relates to a computer including a power switch and a controller. If the power switch of the computer has been activated in a first manner, the controller controls a system power operation (or function) of the computer. If the power switch of the computer has been activated in a second manner, the controller controls an operation (or function) of the computer other than a system power operation (or function) of the computer. The operation of the computer other than a system power operation (or function) of the computer may be, for example, a suspend/resume operation (or function) of the computer.

DETAILED DESCRIPTION

Figure 1:
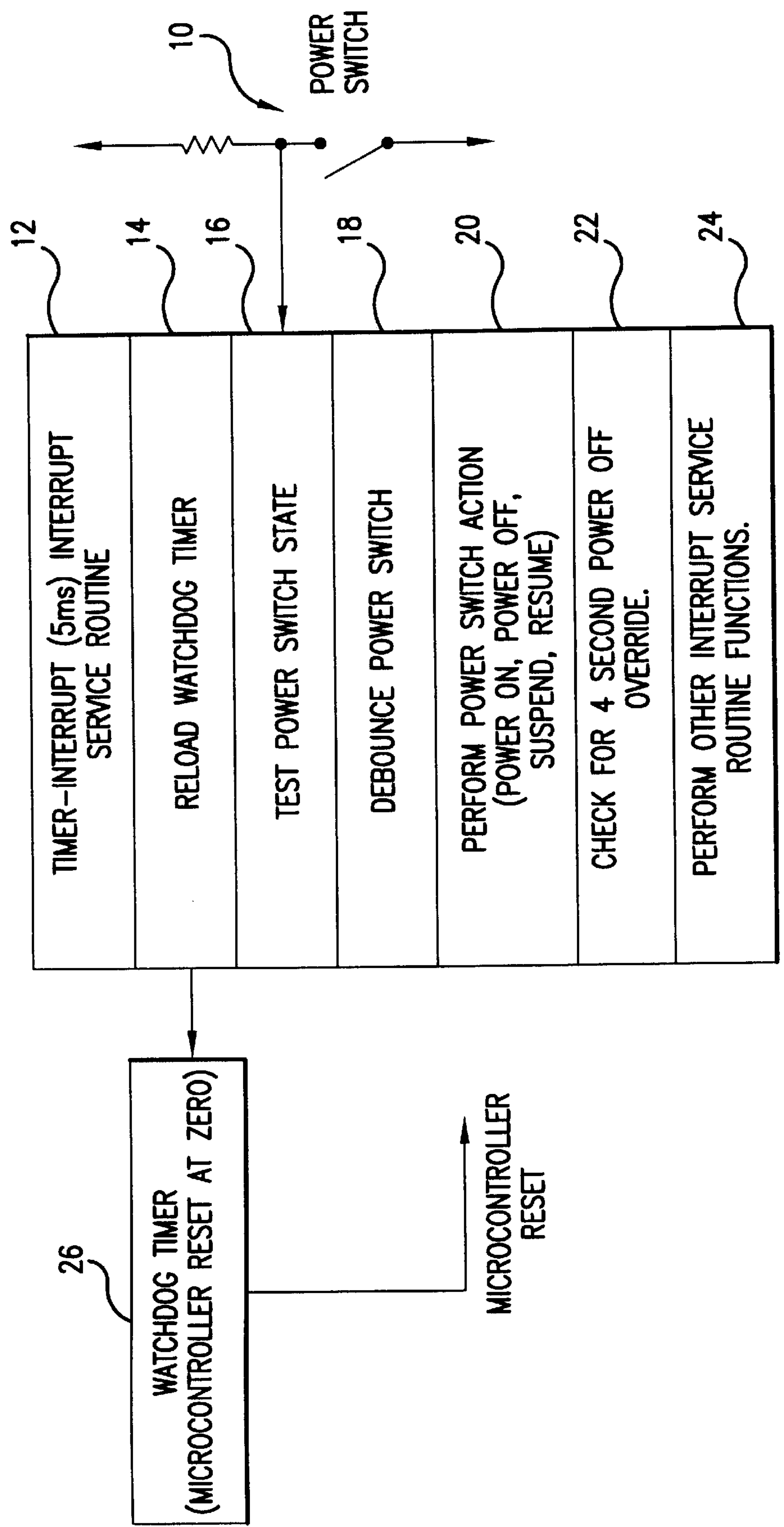
FIG. 1 illustrates a graphical depiction of microcontroller power switch management according to an embodiment of the present invention.

FIG. 1 illustrates a graphical depiction of microcontroller power switch management according to an embodiment of the present invention. The microcontroller power switch management controller illustrated in FIG. 1 includes a power switch 10 (or power button). The power switch management controller includes a timer-interrupt interrupt service routine 12 provided within a computer which includes a reload watchdog timer state 14, a test power switch state 16, a debounce power switch state 18, a perform power switch action state 20, a check for power switch override state 22, and a perform other interrupt service routine functions state 24. The power switch management controller additionally includes a microcontroller system watchdog timer 26.

The microcontroller power switch management monitors the system power button to provide fault tolerant power button monitoring by use of an event monitor interrupt service routine, represented in the state diagram illustrated in FIG. 1. The reload watchdog timer state 14 reprograms the system watchdog timer 26 with a value slightly greater than the longest period of time between the event monitor's timer interrupts being serviced (i.e., the longest period of time the interrupt service routine can be masked). If the microcontroller malfunctions, for example, due to a hardware or firmware failure, and therefore does not service the event monitor's timer interrupt, the watchdog timer 26 will reset the microcontroller by sending a microcontroller reset signal to a microcontroller, thus causing the system to power off unconditionally. The test power switch state 16 reads the signal from the power switch 10 and notes the current state of the power switch 10 in an internal memory location. The debounce power switch state 18 waits until the power management controller reads the same state of the power switch 10 several times before taking action after a transition. This is to ensure that the power management controller does not falsely interpret electrical glitches on the power switch input caused by the mechanical action of the switch as actual power switch pulses. The perform power switch action state 20 takes action if the debounced power switch is activated, and performs one of several possible actions as follows.

1. If system power is on and the power switch is functioning as the suspend switch (i.e., is reprogrammed as the suspend switch), initiate a suspend sequence.

2. If system power is on and the power switch is not functioning as the suspend switch (i.e., is not reprogrammed as the suspend switch), initiate a power off sequence.

3. If system power is off, initiate a power on sequence.

4. If the system is suspended and the power switch is activated (the power button is pressed down), initiate resume sequence.

The check for power switch override state 22 unconditionally powers off the system if the system power is on or the system is in a suspend mode (i.e., the system is suspended), and the user holds the power button down for a predetermined period of time (e.g., four seconds).

The microcontroller can stop execution for a variety of reasons (some firmware based, and some hardware based). An embodiment of the present invention including the power switch management control illustrated in FIG. 1 includes several components that, when used as a group, provide fool-proof power switch operation.

A method of power switch management according to an embodiment of the present invention includes several components:

1. Timer interrupt-driven power switch polling.

2. Timer interrupt-driven watchdog timer reset.

3. Watchdog system reset upon timeout.

4. Reprogramming of the power switch to act as a resume event when suspended.

5. Software override of the power switch when the power switch is activated (e.g., when the power button is held down) for at least a predetermined time period (e.g., for at least four seconds).

The power switch management control according to an embodiment of the present invention ensures that the system will never fail to respond to the power button. By combining several software and firmware methods, each with a low probability of failure, embodiments of the present invention dramatically reduce the chance of total power button failure.

The present invention provides a fail-safe power button operation without the addition of external hardware and/or hardware system reset buttons. Some contemporary notebook computer designs incorporate a hardware override to reset the entire system (including the onboard microcontroller) that can be used if the system ever fails to respond to the power button. The present invention accomplishes the same goals without the added cost or complexity of an external reset switch, or external hardware override circuitry. In addition, ergonomic value is brought to a notebook computer by eliminating system power state function switches which often confuse the end user. The power switch becomes the focal point for all power state mode management of the system.

The present invention combines several preventative actions. By combining steps that have a low probability of failure, the overall probability of failure is drastically reduced, since linked probabilities multiply together.

Figure 2:
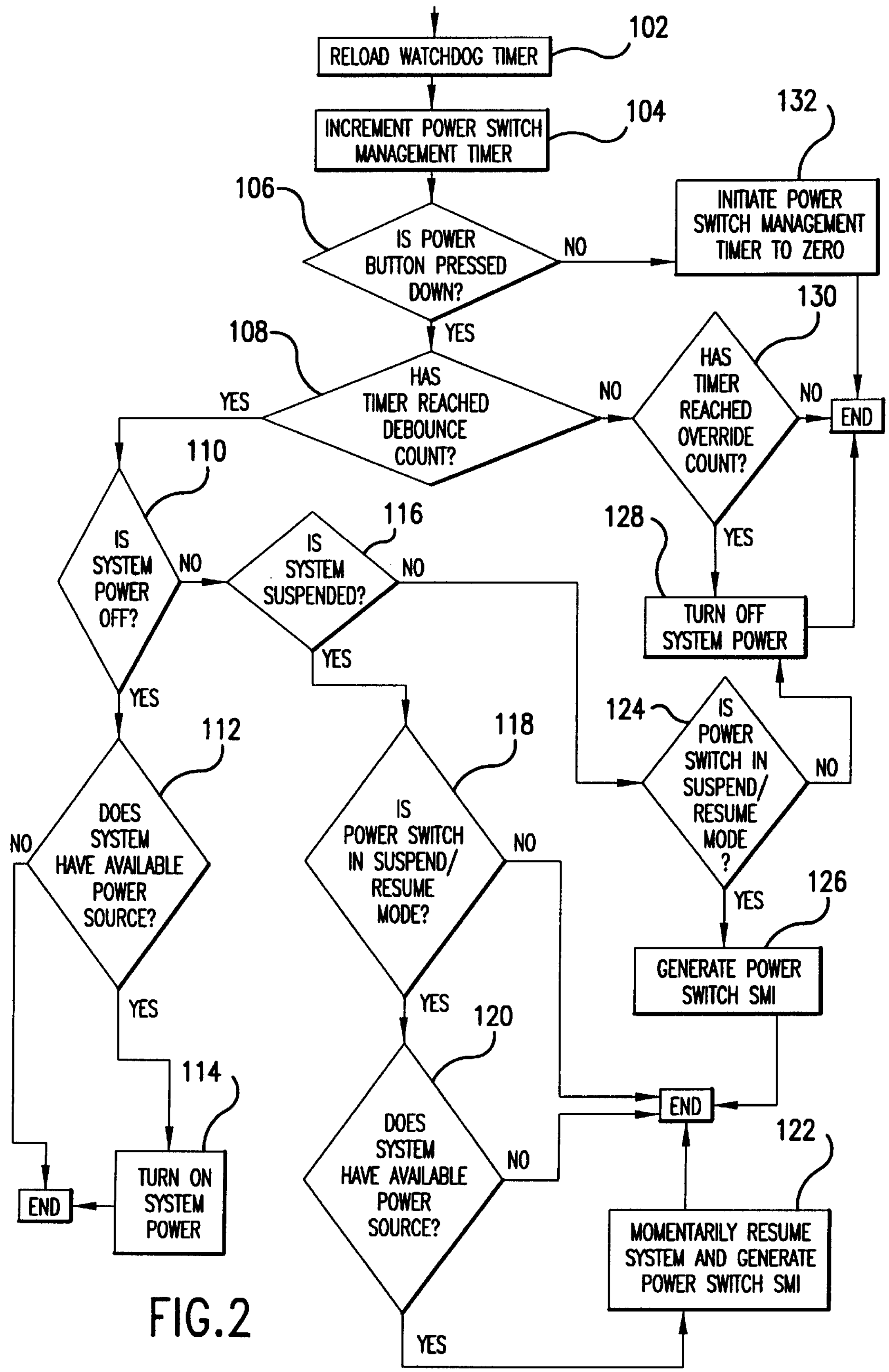
FIG. 2 illustrates a flow chart diagram depicting power switch management according to an embodiment of the present invention.

FIG. 2 illustrates a flow chart of power switch management control according to an exemplary embodiment of the present invention. In step 102, the watchdog timer is reloaded. Then the power switch management timer is incremented in step 104. Step 106 determines if the power button is currently being pressed down (i.e., if the power switch is activated). If the power switch is activated, step 108 determines if the timer has reached the debounced count. If so, step 110 determines if the system power is off. If the system power is off, step 112 determines if the system has an available power source. If the system does have an available power source step 114 turns on the system power. If step 110 determines that the system power is not off, step 116 determines if the system is suspended. If the system is suspended, step 118 determines if the power switch is in a suspend/resume mode. If so, step 120 determines if the system has an available power source. If the system does have an available power source in step 120, step 122 momentarily resumes the system and generates a power switch SMI (system management interrupt). If step 116 determines that the system is not suspended, step 124 determines if the power switch is in a suspend/resume mode. If the power switch is in a suspend/resume mode in step 124, a power switch SMI (system management interrupt) is generated. If step 124 determines that the power switch is not in a suspend/resume mode, the system power is turned off in step 128. If step 108 determines that the timer has not reached the debounced count, step 130 determines if the timer has reached the override count. If so, the system power is turned off in step 128. If step 106 determines that the power button has not been pressed down (i.e., the power switch is not activated), step 132 initiates the power switch management timer to zero.

A pseudo-program language providing power switch management according to a timer-interrupt interrupt service routine according to an embodiment of the present invention is set forth below. Although the flow chart illustrated in FIG. 2 and the following psuedo-code has been provided here as embodiments of implementing the present invention, other embodiments of implementing the present invention may be provided without adhering to the specific embodiments illustrated and described herein.

```
If power button is down
  If timer has reached debounced count
    If system power is off
      If system has available power source
        Turn on system power
      Endif
    Else if system power is on and system is
suspended
      If power switch is suspend/resume button
        If system has available power source
          Resume system momentarily and
            generate power switch SMI
        Endif
      Endif (no action for suspended and non-
          power switch suspend/resume)
    Else (system power is on and system is not
suspended)
      If power switch is suspend/resume button
        Generate power switch SMI
      Else
        Turn off system power
      Endif
    Endif
  Else if timer has reached override count
    Turn off system power
  Endif
Else
  Init power switch management timer to zero
Endif
```

Although embodiments are specifically illustrated and described herein, it will be appreciated that modifications and variations of the present invention are covered by the above teachings and within the purview of the appended claims without departing from the spirit and intended scope of the invention.

The present invention as described herein is particularly advantageous in a portable computer such as a notebook computer or a laptop computer. However, the present invention may be implemented using any other sort of computer. For example, the present invention may be implemented in any personal computer or desktop computer or any other type of computer having a power switch or power button.

According to embodiments of the present invention, system power functions of a computer and other functions of a computer may be controlled in response to a single power switch or power button. For example, the power switch or power button of the computer may be used to provide on/off system power functions and/or suspend/resume functions (or other functions of the computer other than system power functions. In an embodiment of the present invention, the method and/or controller dynamically determines the current state of the power button. For example, a long activation of the power button could indicate a power on or power off of the computer while a quick push of the power button could provide a suspend or resume function of the computer, or any function of the computer other than a system power function of the computer.

Additionally, the exemplary embodiments discussed above have indicated that the present invention may be implemented using a microcontroller. Other embodiments of the present invention may be implemented without requiring a specific microcontroller.

What is claimed is:

1. A method of power switch management of a computer including a power switch and a microcontroller, said method comprising steps of:

if said power switch has been activated in a first manner, performing a system power operation of said computer;

if said power switch has been activated in a second manner, performing a suspend/resume operation of said computer;

determining whether the microcontroller has serviced an interrupt, said interrupt having been generated in response to said power switch being activated by either said first or second manner; and resetting the microcontroller and powering off said computer if said interrupt was not serviced by the microcontroller.

2. A method according to claim 1, wherein said first manner comprises an activation of said power switch for a time period of at least a predetermined time period and said second manner comprises an activation of said power switch for a time period less than said predetermined time period.

3. A method according to claim 2, wherein said predetermined time period comprises four seconds.

4. A method according to claim 1, wherein said system power operation includes at least one of turning on system power of said computer and turning off system power of said computer.

5. A method according to claim 1, wherein said suspend/resume operation includes at least one of controlling said computer to be in a suspend mode and controlling said computer to be in a resume mode.

6. A method according to claim 1, wherein said computer comprises a portable computer.

7. A method according to claim 1, wherein said computer comprises a notebook computer.

8. A method according to claim 1, wherein said computer comprises a desk top computer.

9. A computer comprising:

a power switch;

a controller controlling a system power operation of said computer if said power switch has been activated in a first manner and controlling a suspend/resume operation of said computer if said power switch has been activated in a second manner; and a watchdog timer coupled to said controller that determines whether said controller has serviced an interrupt that was generated in response to said power switch being activated by either said first or second manner, and that resets said controller and powers off said computer if said interrupt was not serviced by said controller.

10. A computer according to claim 9, wherein said first manner comprises an activation of said power switch for a time period of at least a predetermined time period and said second manner comprises an activation of said power switch for a time period less than said predetermined time period.

11. A computer according to claim 10, wherein said predetermined time period comprises four seconds.

12. A computer according to claim 9, wherein said system power operation includes at least one of turning on system power of said computer and turning off system power of said computer.

13. A computer according to claim 9, wherein said suspend/resume operation includes at least one of controlling said computer to be in a suspend mode and controlling said computer to be in a resume mode.

14. A computer according to claim 9, wherein said controller includes a microcontroller.

15. A computer according to claim 9, wherein said controller includes a timer-interrupt interrupt service routine.

16. A computer according to claim 15, wherein said timer-interrupt interrupt service routine is performed approximately every 5 ms.

17. A computer according to claim 9, wherein said computer comprises a portable computer.

18. A computer according to claim 9, wherein said computer comprises a notebook computer.

19. A computer according to claim 9, wherein said computer comprises a desktop computer.

20. A method of power switch management of a computer which includes a power switch and a microcontroller, said method comprising steps of:

if said power switch has been activated in a first manner, performing a system power operation of said computer;

if said power switch has been activated in a second manner, performing an operation of said computer other than a system power operation of said computer;

determining whether the microcontroller has serviced an interrupt, said interrupt having been generated in response to said power switch being activated by either said first or second manner; and resetting the microcontroller and powering off said computer if said interrupt was not serviced by the microcontroller.

21. A method according to claim 20, wherein said first manner comprises an activation of said power switch for a time period of at least a predetermined time period and said second manner comprises an activation of said power switch for a time period less than said predetermined time period.

22. A method according to claim 20, wherein said computer comprises a portable computer.

23. A method according to claim 20, wherein said operation of said computer other than a system power operation of said computer comprises a suspend/resume operation of said computer.

24. A computer comprising:

a power switch;

a controller controlling a system power operation of said computer if said power switch has been activated in a first manner and controlling an operation of said computer other than a system power operation of said computer if said power switch has been activated in a second manner; and a watchdog timer coupled to said controller that determines whether said controller has serviced an interrupt that was generated in response to said power switch being activated by either said first or second manner, and that resets said controller and powers off said computer if said interrupt was not serviced by said controller.

25. A computer according to claim 24, wherein said first manner comprises an activation of said power switch for a time period of at least a predetermined time period and said second manner comprises an activation of said power switch for a time period less than said predetermined time period.

26. A computer according to claim 24, wherein said computer comprises a portable computer.

27. A computer according to claim 24, wherein said operation of said computer other than a system power operation of said computer comprises a suspend/resume operation of said computer.

* * * * *